(12) United States Patent
Benisty et al.

(10) Patent No.: US 11,507,508 B2
(45) Date of Patent: Nov. 22, 2022

(54) PREDICTION-BASED SELECTIVE FLUSHING OF DATA TO MEMORY

(71) Applicant: Western Digital Technologies, Inc., San Jose, CA (US)

(72) Inventors: Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 101 days.

(21) Appl. No.: 17/211,592

(22) Filed: Mar. 24, 2021

(65) Prior Publication Data

US 2022/0107893 A1 Apr. 7, 2022

Related U.S. Application Data

(60) Provisional application No. 63/087,732, filed on Oct. 5, 2020.

(51) Int. Cl.
*G06F 12/0804* (2016.01)

(52) U.S. Cl.
CPC .... *G06F 12/0804* (2013.01); *G06F 2212/601* (2013.01)

(58) Field of Classification Search
CPC .............. G06F 12/0804; G06F 2212/601
See application file for complete search history.

(56) References Cited

U.S. PATENT DOCUMENTS

| | | | | |
|---|---|---|---|---|
| 9,141,543 B1* | 9/2015 | Schuttenberg | ...... | G06F 12/0804 |
| 10,678,480 B1* | 6/2020 | Armangau | ............ | G06F 3/0659 |
| 2004/0093463 A1* | 5/2004 | Shang | ................ | G06F 11/1076 |
| | | | | 711/135 |
| 2010/0306448 A1* | 12/2010 | Chen | .................. | G06F 12/0804 |
| | | | | 711/143 |
| 2014/0379990 A1* | 12/2014 | Pan | ..................... | G06F 12/0871 |
| | | | | 711/135 |
| 2020/0201773 A1* | 6/2020 | Alagumuthu | ....... | G06F 12/0871 |
| 2021/0126922 A1* | 4/2021 | Stokes | ................ | G06F 21/6227 |

* cited by examiner

*Primary Examiner* — Prasith Thammavong
(74) *Attorney, Agent, or Firm* — Patterson & Sheridan, LLP; Steven H. VerSteeg

(57) ABSTRACT

The present disclosure generally relates to improving write cache utilization by recommending a time to initiate a data flush operation or predicting when a new write command will arrive. The recommending can be based upon considerations such as a hard time limit for data caching, rewarding for filling the cache, and penalizing for holding data for too long. The predicting can be based on tracking write command arrivals and then, based upon the tracking, predicting an estimated arrival time for the next write command. Based upon the recommendation or predicting, the write cache can be flushed or the data can remain in the write cache to thus more efficiently utilize the write cache without violating a hard stop time limit.

6 Claims, 5 Drawing Sheets

PREDICTION-BASED SELECTIVE FLUSHING OF DATA TO MEMORY

CROSS-REFERENCE TO RELATED APPLICATIONS

This application claims benefit of U.S. Provisional Patent Application Ser. No. 63/087,732, filed Oct. 5, 2020, which is herein incorporated by reference.

BACKGROUND OF THE DISCLOSURE

Field of the Disclosure

Embodiments of the present disclosure generally relate to flushing data from a write cache to a memory device to improve write performance.

Description of the Related Art

Sequential writing of data to a memory device, such as NAND, is usually preferred over random writing due to performance aspects. In order to allow sequential writing for random data types, a common solution is to use a write cache. A write cache is a location where the data storage device accumulates the data to be written so as to allow sequential writing to occur. For example, QLC devices may have write caches capable of accumulating chunks of 512 KB which is written together to the memory device in a sequential manner. For QLC, the 512 KB is actually four sub-chunks of data with a size of 128 KB.

The decision about whether to continue accumulating more random data in the write cache or to program the content of the write cache (i.e., flush or evacuate the cache) is not a trivial decision. The decision involves a trade-off of several considerations.

One consideration is that it is desirable to minimize the amount of data held in the write cache for long periods of time. Holding a large amount of data in the write cache requires allocation of important, and oftentimes expensive, buffer resources. Additionally, the content of the write cache has to be immune from power loss incidents (PLIs). As more data is held for a longer duration in the write cache, more efforts and resources are necessary to protect the data from PLIs and to allow recovery after a PLI. The resources would be necessary until both the program begins and during the copy to the memory device procedure.

Another consideration is that it is preferable to write data in full data chunks (e.g., 512 KB) to the memory device and not partial chunks. Programming a partial chunk will result in performance degradation.

Another consideration is that there is typically a maximum allowed hard stop time limit to hold the data in the write cache before writing to the data to the memory device.

The decision of when to flush the write cache currently does not take into account the expected duration until a new write command will arrive. Therefore, there is a need in the art to provide an estimation of the expected duration for arrival of the next write command to allow optimizing write performance by improved write cache utilization.

SUMMARY OF THE DISCLOSURE

The present disclosure generally relates to improving write cache utilization by recommending a time to initiate a data flush operation or predicting when a new write command will arrive. The recommending can be based upon considerations such as a hard time limit for data caching, rewarding for filling the cache, and penalizing for holding data for too long. The predicting can be based on tracking write command arrivals and then, based upon the tracking, predicting an estimated arrival time for the next write command. Based upon the recommendation or predicting, the write cache can be flushed or the data can remain in the write cache to thus more efficiently utilize the write cache without violating a hard stop time limit.

In one embodiment, a data storage device comprises: a memory device; and a controller coupled to the memory device wherein the controller is configured to: calculate a time since a write command within a write cache was received in the write cache; determine an amount of data currently in the write cache; and determine whether a hard stop time parameter minus the time is less than the hard stop time parameter times a preselected time value, wherein the preselected time value is less than 1.

In another embodiment, a data storage device comprises: a memory device; and a controller coupled to the memory device wherein the controller is configured to: collect data regarding a frequency of write commands received; collect data regarding an average command size of write commands received; collect data regarding an average power necessary to flush data from a write cache to the memory device during a power loss incident (PLI); and determine whether a next write command is expected prior to a hard stop time parameter.

In another embodiment, a data storage device comprises: a memory device; and a controller coupled to the memory device, the controller comprising: one or more write cache buffers; and means to manage the one or more write cache buffers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improving write cache utilization by recommending a time to initiate a data flush operation or predicting when a new write command will arrive. The recommending can be based upon considerations such as a hard time limit for data caching, rewarding for filling the cache, and penalizing for holding data for too long. The predicting can be based on tracking write command arrivals and then, based upon the tracking, predicting an estimated arrival time for the next write command. Based upon the recommendation or predicting, the write cache can be flushed or the data can remain in the write cache to thus more efficiently utilize the write cache without violating a hard stop time limit.

Figure 1:
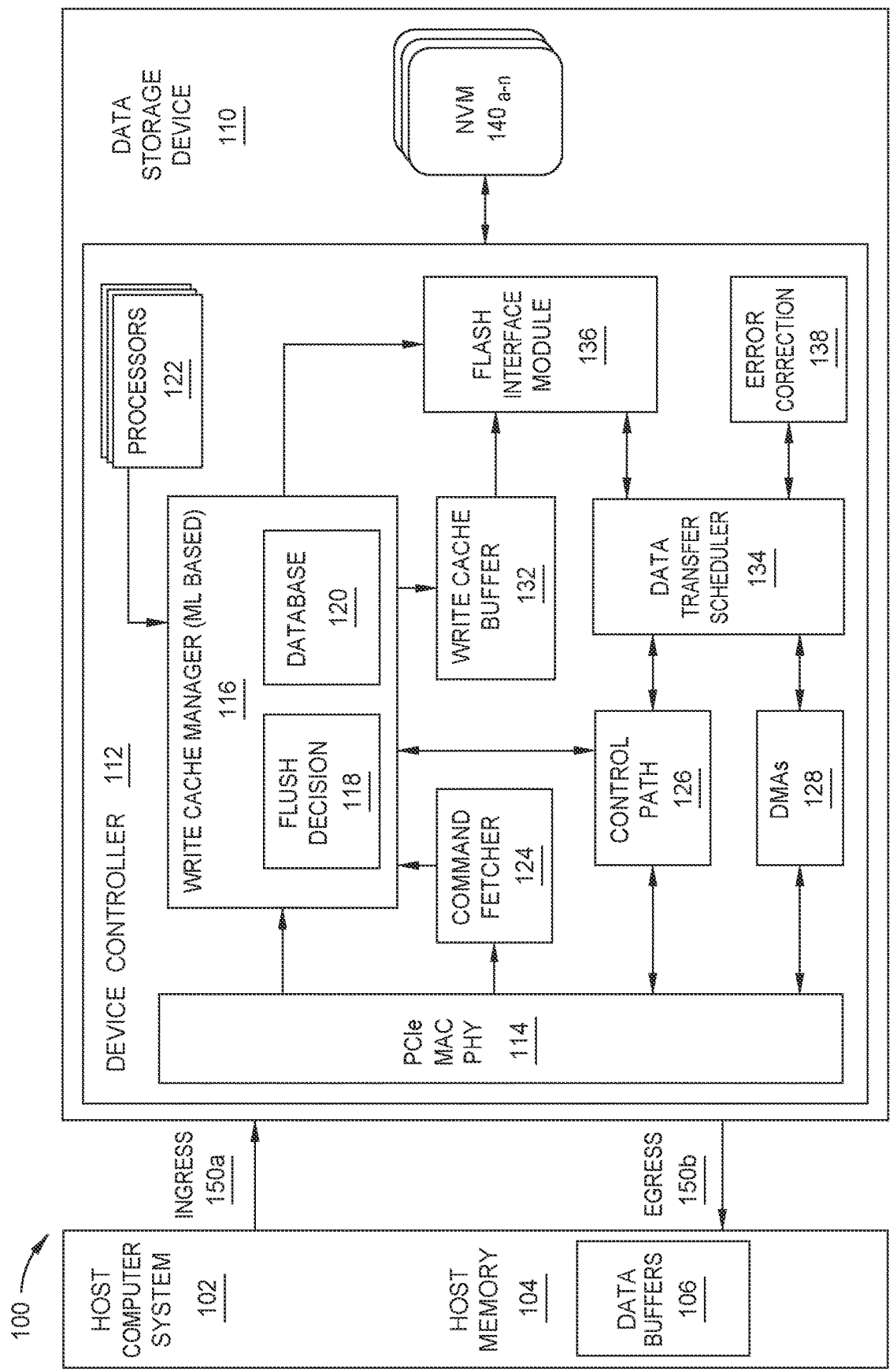
FIG. 1 is a schematic illustration of a data storage system, according to one embodiment.

FIG. 1 is a schematic illustration of a data storage system 100, according to one embodiment. The data storage system 100 includes a host computer system 102 and a data storage device 110. The data storage device 110 may function as a storage device for the host computer system 102. For instance, the host computer system 102 may utilize one or more non-volatile memories (NVMs) 140*a-n*, such as NANDs, included in the data storage device 110 to store and retrieve data. In some examples, the data storage system 100 may include a plurality of storage devices, such as the data storage device 110, which may operate as a storage array. For example, the data storage system 100 may include a plurality of data storage devices 110 configured as a redundant array of inexpensive/independent disks (RAID) that collectively function as a mass data storage device for the host computer system 102.

The host computer system 102 includes a host memory 104 that includes one or more data buffers 106. It is to be understood that the host memory 104 includes components not shown for exemplary purposes. The one or more data buffers 106 may hold generated commands and the associated data to be transferred to the data storage device 110. The host computer system 102 may communicate with the data storage device 110 via an interface. The host computer system 102 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 110 includes a device controller 112, a volatile memory, such as a dynamic random-access memory (DRAM), and one or more non-volatile memory devices, such as one or more NVMs 140*a-n*. In some examples, the data storage device 110 may include additional components not shown in FIG. 1 for the sake of clarity. For example, the data storage device 110 may include a printed circuit board (PCB) to which components of the data storage device 110 are mechanically attached and which includes electrically conductive traces that electrically interconnect components of the data storage device 110, or the like. In some examples, the physical dimensions and connector configurations of the data storage device 110 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 110 may be directly coupled (e.g., directly soldered) to a motherboard of the host computer system 102.

In some examples, the data storage device 110 may include an interface, which may include one or both of a data bus (e.g., an ingress bus 150*a* and an egress bus 150*b*) for exchanging data with the host computer system 102 and a control bus for exchanging commands with the host computer system 102. The interface may operate in accordance with any suitable protocol. For example, the interface may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface (e.g., the data bus, the control bus, or both) is electrically connected to the device controller 112, providing electrical connection between the host computer system 102 and the device controller 112, allowing data to be exchanged between the host computer system 102 and the device controller 112. In some examples, the electrical connection of the interface may also permit the data storage device 110 to receive power from the host computer system 102. For example, a power supply may receive power from the host computer system 102 via the interface.

The one or more NVMs 140*a-n* may be configured to store and/or retrieve data. For instance, a memory unit of the one or more NVMs 140*a-n* may receive data and a message from the device controller 112 that instructs the memory unit to store the data. Similarly, the memory unit of the one or more NVMs 140*a-n* may receive a message from the device controller 112 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of the one or more NVMs 140*a-n* may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The one or more NVMs 140*a-n* may include a plurality of flash memory devices or memory units. Flash memory devices may include NAND or NOR based flash memory devices and may store data based on a charge contained in a floating gate of a transistor for each flash memory cell. In NAND flash memory devices, the flash memory device may be divided into a plurality of blocks, which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices and may be single level cell (SLC), multi-level cell (MLC), triple level cell (TLC), or quad level cell (QLC). The device controller 112 may write data to and read data from NAND flash memory devices at the page level and erase data from NAND flash memory devices at the block level.

In some examples, the data storage device 110 includes a power supply, which may provide power to one or more components of the data storage device 110. When operating in a standard mode, the power supply may provide power to one or more components using power provided by an external device, such as the host computer system 102. For instance, the power supply may provide power to the one or more components using power received from the host computer system via the interface of the data storage device 110. In some examples, the power supply may include one or more power storage components configured to provide power to the one or more components when operating in a shutdown mode, such as where power ceases to be received from the external device. In this way, the power supply may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

In some examples, the data storage device 110 may include one or more volatile memories, such as the DRAM, which may be used by the device controller 112 to store information. Furthermore, the device controller 112 may include one or more volatile memories. In some examples, the device controller 112 may use volatile memory as a cache. For instance, the device controller 112 may store cached information in volatile memory until cached information is written to the one or more NVMs 140a-n. Examples of volatile memory include, but are not limited to, random-access memory (RAM), DRAM, static RAM (SRAM), and synchronous dynamic RAM (SDRAM (e.g., DDR1, DDR2, DDR3, DDR3L, LPDDR3, DDR4, LPDDR4, and the like)).

The device controller 112 may manage one or more operations of the data storage device 110. For instance, the device controller 112 may manage the reading of data from and/or the writing of data to the one or more NVMs 140a-n. In some embodiments, when the data storage device 110 receives a write command from the host computer system 102, the device controller 112 may initiate a data storage command to write data to the one or more NVMs 140a-n and monitor the progress of the data storage command. The device controller 112 may determine at least one operational characteristic of the data storage system 100 and store the at least one operational characteristic to the one or more NVMs 140a-n. In some embodiments, when the data storage device 110 receives a write command from the host computer system 102, the controller 112 temporarily stores the data associated with the write command in the internal memory or a write buffer, such as a write cache buffer 132, before sending the data to the one or more NVMs 140a-n.

The device controller 112 includes a PCIe MAC PHY 114, a write cache manager 116, a command fetcher 124, a control path 126, one or more direct memory accesses (DMAs) 128, a write cache buffer 132, a data-transfer scheduler 134, a flash interface module (FIM) 136, an error correction module 138, and one or more processors 122. The one or more processors 122 is a chip or a logical circuit that responds and processes commands to operate a computing system, such as the data storage device 110. The one or more processors 122 may perform all mathematical operations and manage the controller operations.

The write cache manager 116 includes a flush decision engine 118 and a database 120. The write cache manager 116 may be responsible for the scheduling of writing data and commands to the write cache buffer 132. For example, the write cache manager 116 may schedule data to be written to the write cache buffer 132 that does not reach the minimum write size. The write cache manager 116 may have machine learning (ML) capabilities, such that the controls and the actions of the write cache manager 116 may be optimized. For example, the write cache manager 116 may include a ML scheme that asserts a penalty for holding data in the write cache buffer 132 past a threshold time and a reward for filling the write cache buffer 132. In some examples, the threshold time may be about 1 second. The penalty may be asserted due to the inefficient usage or occupation of data storage device 110 resources. The reward may be asserted due to the programming of data from the write cache buffer 132 may be more sequential and have better performance.

Furthermore, the flush decision engine 118 may determine when the write cache buffer 132 will need to be flushed to the one or more NVMs 140a-n. For example, when the device controller 112 detects a power loss incident event, the flush decision engine 118 may flush the write cache buffer 132 to the one or more NVMs so that the data stored in the write cache buffer 132 is not lost. The database 120 may store a list or a table to track the location of the data in the write cache buffer.

Ingress and egress of data to the data storage device 110 from the host computer system 102 may be performed through a PCIe MAC PHY 114 utilizing an ingress bus 150a for the ingress of data to the device controller 112 and an egress bus 150b for the egress of data from the device controller 112 to the host computer system 102. If commands have been completed by the device controller 112, the data associated with the completed commands may be transferred through the PCIe MAC PHY 114 to the host queues of the host computer system 102.

Data passes from the PCIe MAC PHY 114 to the control path 126 and the one or more DMAs 128. The one or more DMAs 128 may execute data transfers between host computer system 102 and data storage device 110 without involvement from a host computer system CPU. The control path 126 may be utilized for fetching physical page regions (PRPs), posting completion and interrupts, and activating the DMAs 128 for data transfer between host computer system 102 and data storage device 110. The data-transfer scheduler 134 schedules the read and write operations of the device controller to avoid throttling or bottlenecking the command completion queue. The error correction module 138 corrects the data fetched from the memory arrays. The device controller 112 may utilize the FIM 136 to interact with one or more NVMs 140a-n for read and write operations.

Figure 2:
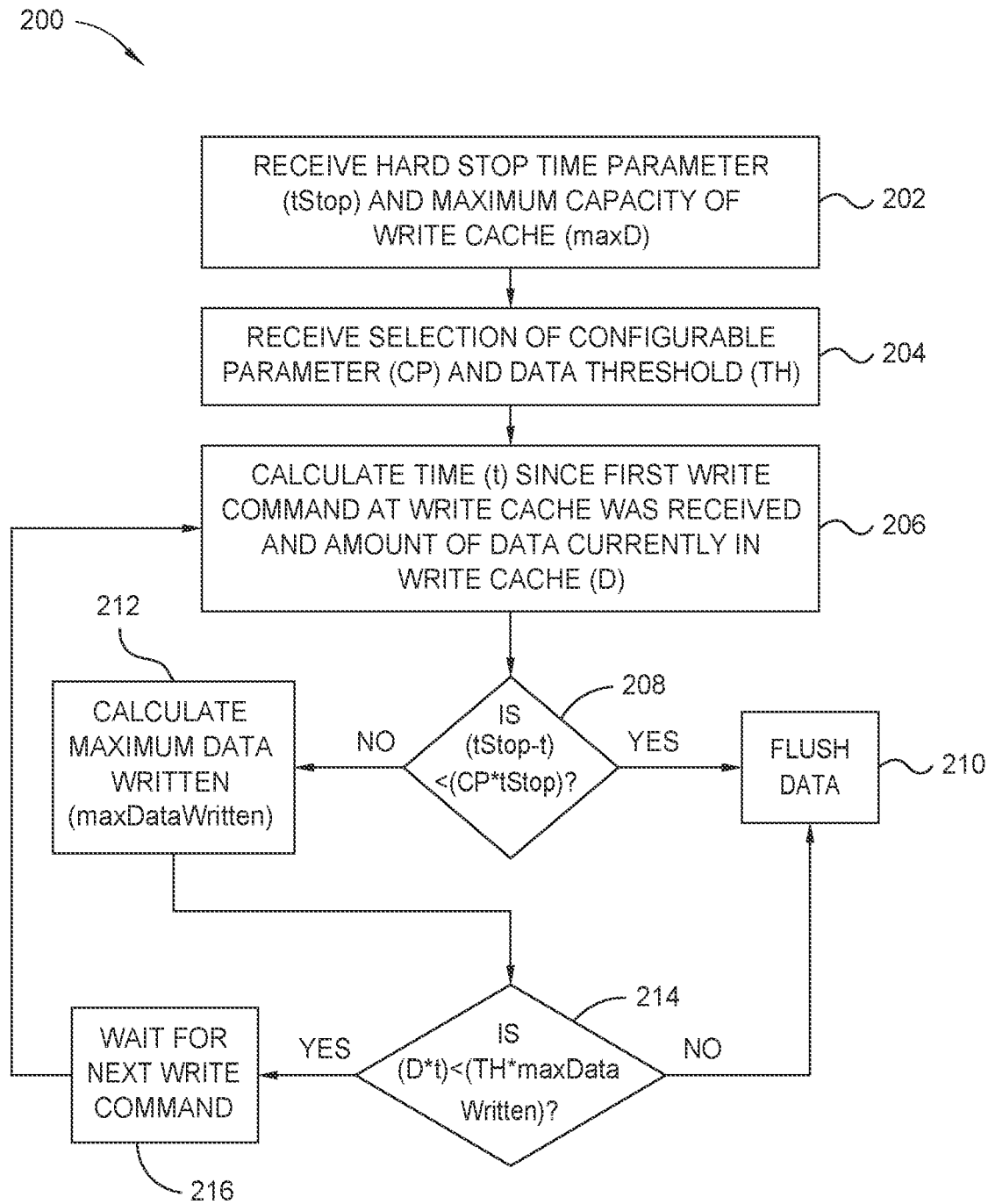
FIG. 2 is a flowchart illustrating a recommendation model for write cache flushing, according to one embodiment.

FIG. 2 is a flowchart illustrating a recommendation model 200 for write cache flushing, according to one embodiment. At block 202, the write cache manager, such as the write cache manager 116 of FIG. 1, receives a hard stop time parameter (tStop) and a maximum capacity of the write cache buffer (maxD). The tStop parameter is the maximum time (t) that data may be held in the write cache buffer, such as the threshold time of about 1 second described in FIG. 1. In some examples, the maxD may have a size of about 512 KB. The previously listed size is not intended to be limiting, but to provide an example of a possible embodiment.

At block 204, the write cache manager receives a selection of configurable parameters (CP) and data thresholds (TH). For example, the TH may be the maximum data allowed to be written to the write cache buffer prior to flushing write cache buffer to the NVM, such as the one or more NVMs 140a-n of FIG. 1. The CP may include the speed of the host interface based upon the number of lanes and the generation of the interface; memory device (e.g., NAND) parameters such as program time, etc.; latencies in the device controller; and resources (e.g., buffers, time, and power) required for flushing the cache to the memory device (e.g., NAND), where the CP may be configurable or tunable parameters for the data storage device adaptively tuned during the data storage device operations according to data traffic types and data storage device conditions.

At block 206, the write cache manager calculates the time (t) since receiving the first write command at the write cache buffer, where the first write command is still in the write cache buffer, and the amount of data stored in the write cache. At block 208, the flush decision engine, such as the flush decision engine 118 of FIG. 1 determines if the time is nearing the hard stop time parameter. For example, the formula, (tStop−t)<(CP*tStop), describes the logic determining if the time since receiving the first write command at the write command is nearing the hard stop time parameter. It is to be understood that the less-than operator (<) may be a less-than-or-equal-to operator (≤) in some embodiments. The "CP" is a configurable parameter that may have a value of about 0.1 or less than about 1, in some examples. The previously listed value is not intended to be limiting, but to provide an example of a possible embodiment. It is to be understood that the example described herein are not intended to be limiting, but to provide support for the embodiments described. For example, if "tStop" is about 50 seconds, "t" is about 48 seconds, and the "CP" value is about 0.1, then the result is 2<5. Because the result is true (2 is less than 5), then at block 210, the data in the write cache buffer is flushed to the NVM.

However, if the result is false, such as when the "tStop−t" value is about 8 and the "CP*tStop" value is about 5, then at block 212, the write cache manager calculates the maximum data written (maxDataWritten). The "maxDataWritten" may be calculated using the following formula: maxDataWritten=maxD*tStop, where "maxD" is the maximum capacity of the write cache and the "tStop" is the hard stop time parameter. At block 214, the formula, (D*t) <TH*maxDataWritten, where "D" is the amount of data currently stored in the write cache buffer and "TH" is the maximum data allowed to be written to the write cache buffer prior to flushing write cache buffer to the NVM, is utilized by the flush decision engine to determine if the write cache buffer should be flushed. The "D*t" may describe an average amount of data stored in the write cache buffer and the "TH*maxDataWritten" is the maximum amount of data to be stored in the write cache buffer before the write cache buffer should be flushed to the NVM, where the "TH" has a value of less than about 1.

If the "(D*t)<TH*maxDataWritten" is returns a true value (i.e., "D*t" is less than "TH*maxDataWritten"), then at block 216, the flush decision engine waits for the write cache manager to receive the next write command, where receiving the next command prompts the write cache manager to calculate the time (t) since receiving the first write command at the write cache buffer, where the first write command is still in the write cache buffer, and the amount of data stored in the write cache at block 206. However, if the "(D*t) <TH*maxDataWritten" is returns a false value (i.e., "D*t" is greater than "TH*maxDataWritten"), then the flush decision engine flushes the data to the NVM at block 210.

Figure 3:
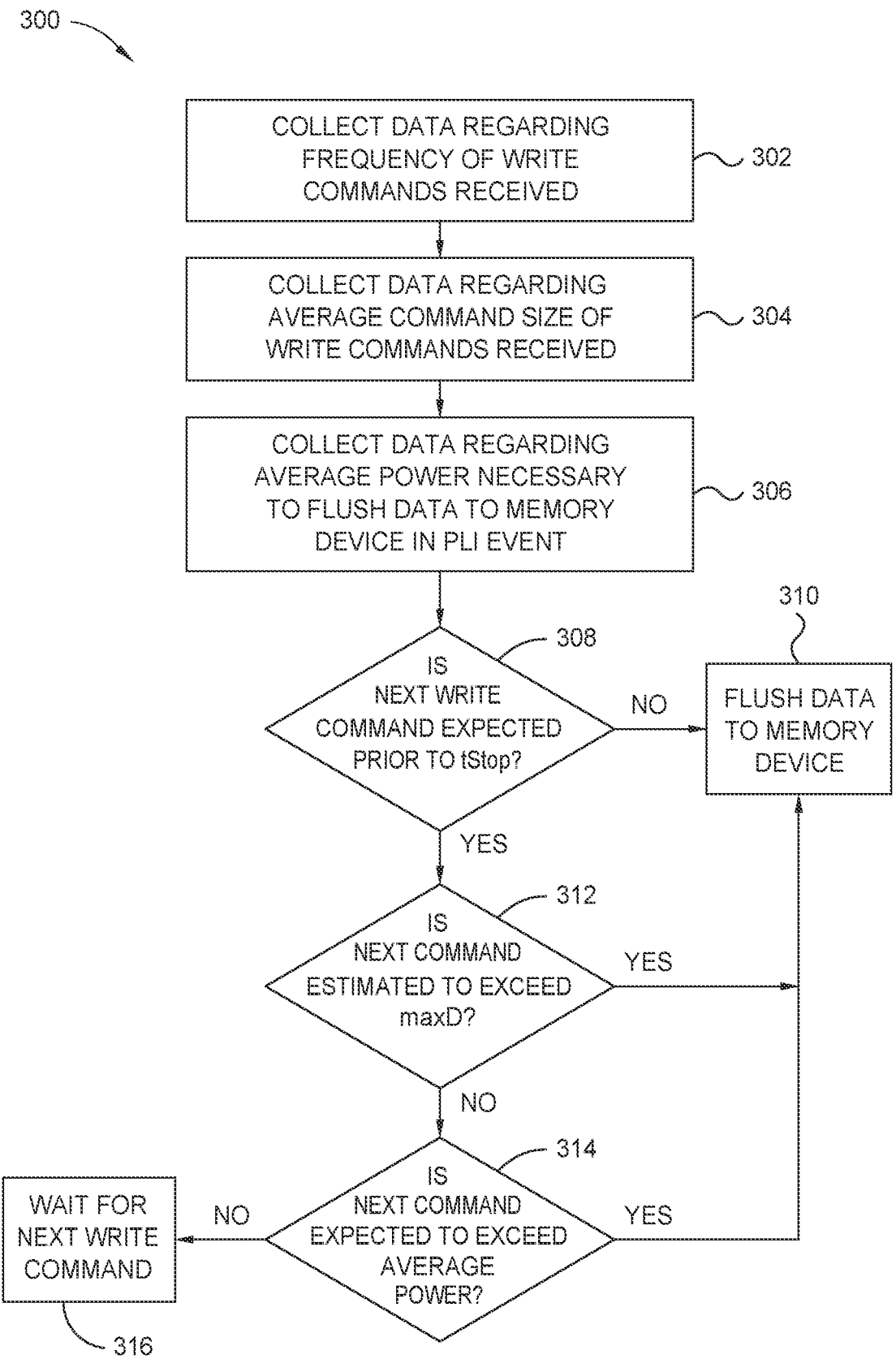
FIG. 3 is a flowchart illustrating a prediction model for write cache flushing, according to one embodiment.

FIG. 3 is a flowchart illustrating a prediction model 300 for write cache flushing, according to one embodiment. By collecting large amounts of write traffic by the write cache manager, such as the write cache manager 116 of FIG. 1, the write cache manager may employ a ML model to predict the probability of receiving the next write command or the time until the next write command is received.

In one example, the ML model includes a binary classification model. For example, a "1" may signify that the next write command may arrive prior to the "tStop" value and a "0" may signify that the next write command may arrive after the "tStop" value. In some examples, the "tStop" value may be any of the following values, such as about 1 ms, about 10 ms, 100 ms, and so-forth. In another example, the ML model includes a regression model targeted to determine or predict the time elapsed before the next write command is received. For example, the regression model may utilize the timing between already received write commands to determine a theoretical or an estimated time to receive the next write command.

At block 302, the write cache manager collects data regarding the frequency of receiving write commands. At block 304, the write cache manager collects data regarding the average command size of the received write commands. At block 306, the write cache manager collects data regarding the average power necessary to flush data in the write cache buffer to the NVM, such as the one or more NVMs 140a-n of FIG. 1, in a power loss incident (PLI) event. The data collected at block 302, at block 304, and at block 306 may be stored in the database, such as the database 120 of FIG. 1, of the write cache manager. Additionally, the blocks 302, 304, 306 may occur in any order.

At block 308, the flush decision engine, such as the flush decision engine 118 of FIG. 1, determines if the next write command is expected arrive prior to the "tStop" parameter. If the next write command is not expected to arrive prior to the "tStop" parameter, the flush decision engine flushes the data stored in the write cache buffer, such as the write cache buffer 132 of FIG. 1. However, if the next write command is expected to arrive prior to the "tStop" parameter, the flush decision engine determines if the estimated size of the next command will exceed the "maxD". If the writing the next write command to the write cache buffer will exceed the "maxD" parameter due to the estimated size, then the flush decision engine flushes the data stored in the write cache buffer to the NVM at block 310.

However, if writing the next command to the write cache buffer does not exceed the "maxD", then at block 314, the flush decision engine determines if the next command is expected to exceed the average power requirement of the write cache buffer. If the next write command is not expected to exceed the average power at block 314, then the write cache manager waits for the next write command to arrive at block 316 and places the expected write command in the write cache buffer. However, if the next write command is expected to exceed the average power requirement, then the data stored in the write cache buffer is flushed to the NVM at block 310. It is contemplated that blocks 308, 312, 314 may occur in any order.

Figure 4:
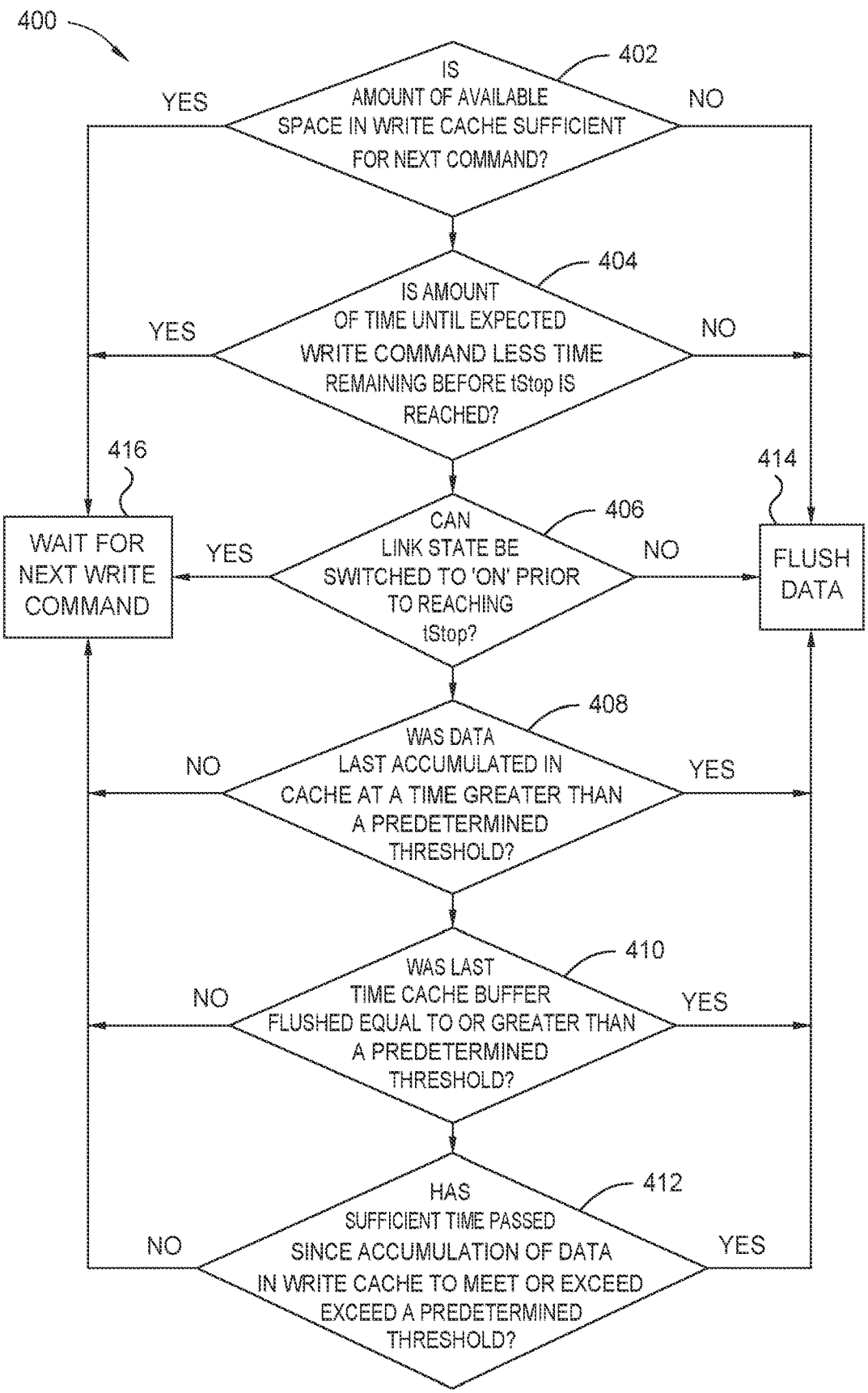
FIG. 4 is a flowchart illustrating a prediction model for write cache flushing, according to another embodiment.

FIG. 4 is a flowchart illustrating a prediction model 400 for write cache flushing, according to another embodiment. Aspects of the prediction model 400 may be similar to the prediction model 300 of FIG. 3 and the recommendation model 200 of FIG. 2. The write cache manager, such as the write cache manager 116 of FIG. 1, of the device controller, such as the device controller 112 of FIG. 1, includes a flush decision engine, such as the flush decision engine 118 of FIG. 1, and a database, such as the database 120 of FIG. 1, to store data regarding parameters such as "maxD", "tStop", and the like. In the description herein, the flush decision engine may utilize the data stored in the database to determine whether to wait for the next write command to arrive at block 416 or to flush the data to one or more memory devices, such as the one or more NVMs 140a-n of FIG. 1, at block 414.

At block 402, the flush decision engine determines if the amount of available space in the write cache buffer is sufficient for the next write command. If the available space is sufficient, the flush decision engine waits for the next write command at block 416. However, if the available space is not sufficient, the flush decision engine flushes the data of the write cache buffer to the one or more NVMs at block 414.

At block 404, the flush decision engine determines if the amount of time until the arrival of the expected write command is less than the time remaining before "tStop" is reached. If the amount of time until the arrival of the expected write command is less than the time remaining before "tStop" is reached, the flush decision engine waits for the next write command at block 416. However, if the amount of time until the arrival of the expected write command is greater than the time remaining before "tStop" is reached, the flush decision engine flushes the data of the write cache buffer to the one or more NVMs at block 414.

At block 406, the flush decision engine determines if the link state can be switched to "on" prior to reaching "tStop". The link state may refer to a sleep state or an active state, where "on" refers to an active state. If the link state can be switched to "on" prior to reaching "tStop", the flush decision engine waits for the next write command at block 416. However, if the link state is not able to be switched to "on" prior to reaching "tStop", the flush decision engine flushes the data of the write cache buffer to the one or more NVMs at block 414.

At block 408, the flush decision engine determines if the time that has been data accumulating in the write cache buffer is greater than a predetermined threshold, such as "TH" as described in FIG. 2 and FIG. 3. If the time that has been data accumulating in the write cache buffer is not greater than a predetermined threshold, the flush decision engine waits for the next write command at block 416. However, if the time that has been data accumulating in the write cache buffer is greater than a predetermined threshold, the flush decision engine flushes the data of the write cache buffer to the one or more NVMs at block 414.

At block 410, the flush decision engine determines if the time since the write cache buffer has last been flushed is greater than or equal to a predetermined threshold, such as "TH" as described in FIG. 2 and FIG. 3. If the time since the write cache buffer has last been flushed is not greater than or equal to a predetermined threshold, the flush decision engine waits for the next write command at block 416. However, if the time since the write cache buffer has last been flushed is greater than or equal to a predetermined threshold, the flush decision engine flushes the data of the write cache buffer to the one or more NVMs at block 414.

At block 412, the flush decision engine determines if the amount of time that has passed since the accumulation of data in the write cache is equal to or greater than the predetermined threshold, such as "TH" as described in FIGS. 2 and 3. If the amount of time that has passed since the accumulation of data in the write cache is not equal to or greater than the predetermined threshold, the flush decision engine waits for the next write command at block 416. However, if the amount of time that has passed since the accumulation of data in the write cache is equal to or greater than the predetermined threshold, the flush decision engine flushes the data of the write cache buffer to the one or more NVMs at block 414.

Figure 5:
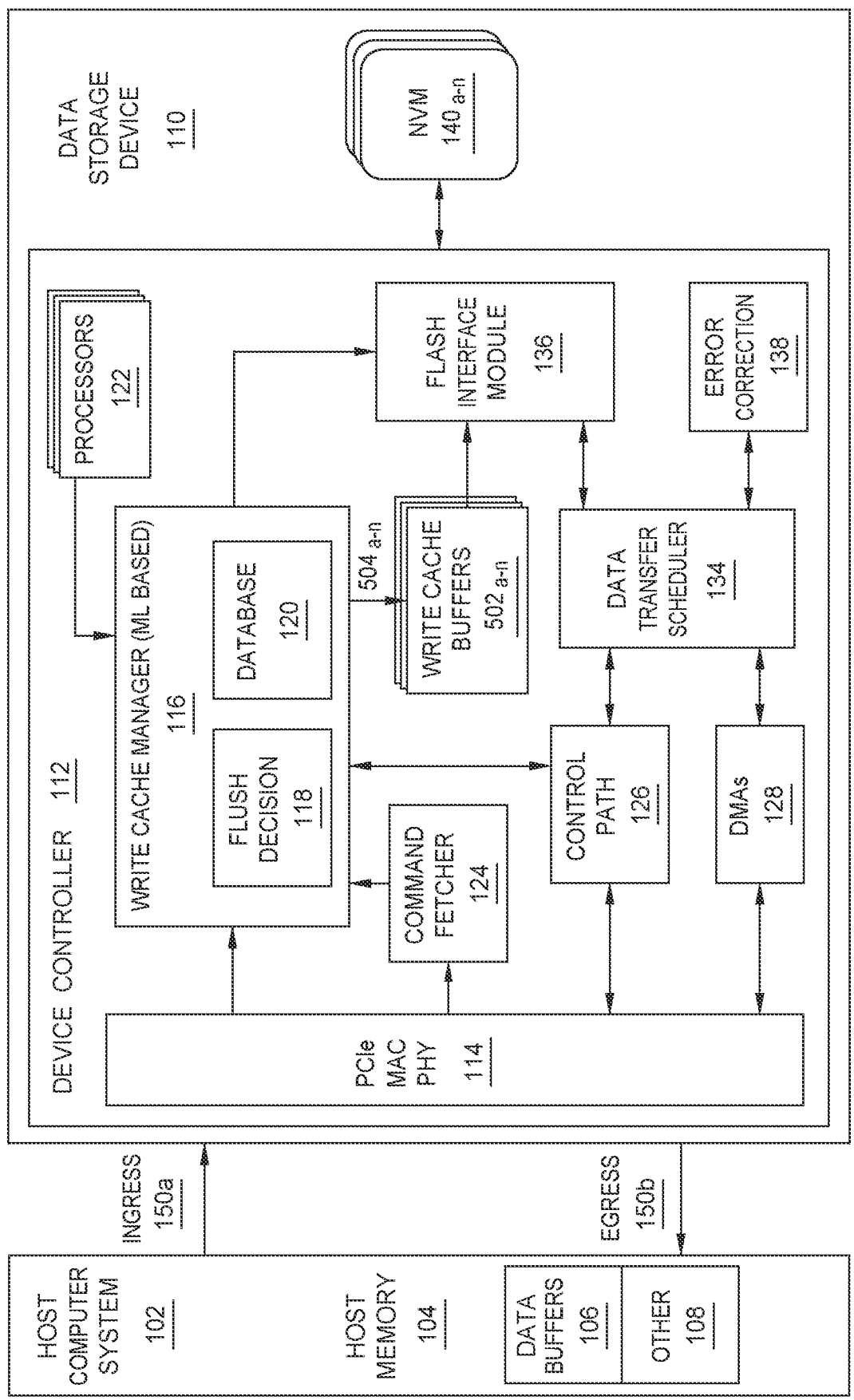
FIG. 5 is a schematic illustration of a data storage system having multiple streams of data, according to one embodiment.

FIG. 5 is a schematic illustration of a data storage system 500 having multiple streams of data, according to one embodiment. Aspects of the data storage system 100 of FIG. 1 may be similar to the data storage system 500. Rather than the device controller 112 including a single write cache buffer 132 as described in FIG. 1, the device controller 112 includes a plurality of write cache buffers 502a-n, where each write cache buffer is configured to maintain a separate stream of a plurality of streams 504a-n of write data. The write cache manager 116 may utilize at least one of the recommendation model 200 of FIG. 2, the prediction model 300 of FIG. 3, and/or the prediction model 400 of FIG. 4 to determine when to flush the data stored in each write cache buffer of the plurality of write cache buffers 502a-n. Each of the write cache buffers of the plurality of write cache buffers 502a-n may be flushed independently of each other, where the write cache manager utilizes the database 120 to keep track of the characteristics and parameters of each of the plurality of write cache buffers 502a-n. Furthermore, it is contemplated that each write cache buffer 502a-n may utilize a different model 200, 300, 400 at any given time. Hence, at least one write cache buffer 502a-n may utilize a first model while at least one other cache buffers 502a-n may utilizes a different model. It is contemplated that more than one cache buffer 502a-n may utilize the same model.

By recommending or predicting when to flush a write cache to a memory device, efficient use of the write cache is obtained without violating a hard stop time limit.

In one embodiment, a data storage device comprises: a memory device; and a controller coupled to the memory device wherein the controller is configured to: calculate a time since a write command within a write cache was received in the write cache; determine an amount of data currently in the write cache; and determine whether a hard stop time parameter minus the time is less than the hard stop time parameter times a preselected time value, wherein the preselected time value is less than 1. When the hard stop time parameter minus the time is less than the hard stop time parameter times the preselected time value, the controller is configured to flush the write cache to the memory device. When the hard stop time parameter minus the time is not less than the hard stop time parameter times the preselected time value, the controller is configured to calculate a maximum data written to the write cache. The controller is further configured to determine whether an amount of data currently in the write cache times the time is less than a predetermined threshold times the maximum data written to the write cache. When the amount of data currently in the write cache times the time is not less than a predetermined threshold times the maximum data written to the write cache, the controller is configured to flush the write cache to the memory device. When the amount of data currently in the write cache times the time is less than a predetermined threshold times the maximum data written to the write cache, the controller is configured to wait for a next write command prior to flushing the write cache to the memory device. The predetermined threshold is less than 1.

In another embodiment, a data storage device comprises: a memory device; and a controller coupled to the memory device wherein the controller is configured to: collect data regarding a frequency of write commands received; collect data regarding an average command size of write commands received; collect data regarding an average power necessary to flush data from a write cache to the memory device during a power loss incident (PLI); and determine whether a next write command is expected prior to a hard stop time parameter. When the next write command is not expected prior to a hard stop parameter, the controller is configured to flush data from the write cache to the memory device. When the next write command is expected prior to a hard stop parameter, the controller is configured to determine whether the next command is estimated to exceed a maximum capacity of the write cache. When the next command is estimated to exceed a maximum capacity of the write cache, the controller is configured to flush the write cache to the memory device. When the next command is not estimated to exceed a maximum capacity of the write cache, the controller is configured to determine whether the next command is expected to exceed an average power requirement. When the next command is expected to exceed an average power requirement, the controller is configured to flush the write cache to the memory device. When the next command is not expected to exceed an average power requirement, the controller is configured to wait for the next command to arrive and place the next command in the write cache.

In another embodiment, a data storage device comprises: a memory device; and a controller coupled to the memory device, the controller comprising: one or more write cache buffers; and means to manage the one or more write cache buffers. The one or more write cache buffers comprises a plurality of write cache buffers, wherein each write cache buffer is configured to maintain a separate stream of write data. The means to manage the one or more write cache buffers comprises a database. The means to manage the one or more write cache buffers is coupled to the one or more write cache buffers, a command fetcher, an interface for coupling with a host device, and a flash interface module. The means to manage the one or more write cache buffers is configured to determine whether an amount of available space within the one or more write cache buffers is sufficient to receive another write command. The means to manage the one or more write cache buffers is configured to determine whether an amount of time until a next write command is received is less than a remaining amount of time before a hard stop time parameter is reached.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device wherein the controller is configured to:
calculate a time since a write command within a write cache was received in the write cache;
determine an amount of data currently in the write cache;
determine whether a hard stop time parameter minus the time is less than the hard stop time parameter times a preselected time value, wherein the preselected time value is less than 1; and
when the hard stop time parameter minus the time is less than the hard stop time parameter times the preselected time value, flush the write cache to the memory device.

2. The data storage device of claim 1, wherein when the hard stop time parameter minus the time is not less than the hard stop time parameter times the preselected time value, the controller is configured to calculate a maximum data written to the write cache.

3. The data storage device of claim 2, wherein the controller is further configured to determine whether an amount of data currently in the write cache times the time is less than a predetermined threshold times the maximum data written to the write cache.

4. The data storage device of claim 3, wherein when the amount of data currently in the write cache times the time is not less than a predetermined threshold times the maximum data written to the write cache, the controller is configured to flush the write cache to the memory device.

5. The data storage device of claim 3, wherein when the amount of data currently in the write cache times the time is less than a predetermined threshold times the maximum data written to the write cache, the controller is configured to wait for a next write command prior to flushing the write cache to the memory device.

6. The data storage device of claim 3, wherein the predetermined threshold is less than 1.

* * * * *